E. E. GREVE.
HOSE COUPLING NOZZLE AND CLAMP
APPLICATION FILED APR. 30, 1918
1,300,956. Patented Apr. 15, 1919.
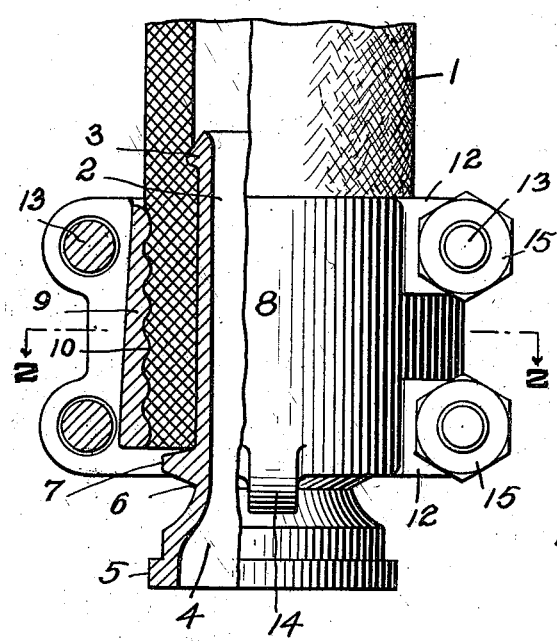
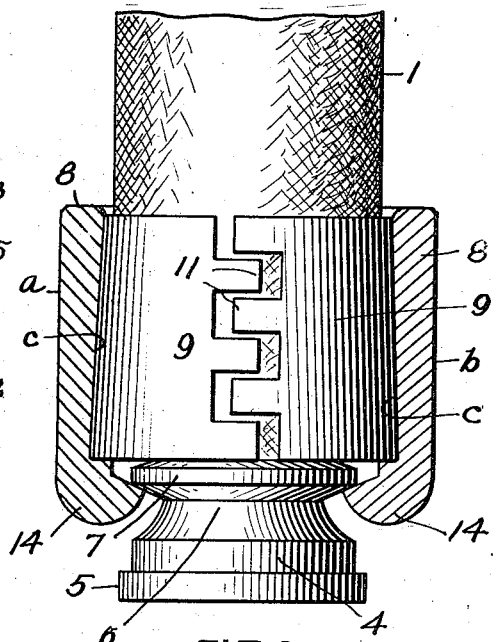
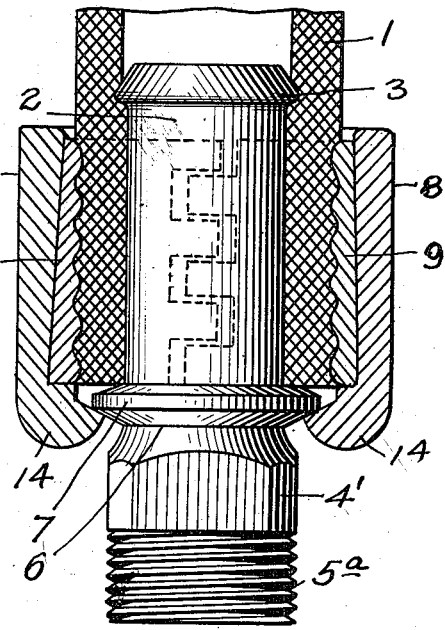
WITNESSES
J. Herbert Bradley
Lois Vineman
INVENTOR
E. E. Greve
by W. J. Doolittle
Attorney.

UNITED STATES PATENT OFFICE.

EDGAR E. GREVE, OF BELLEVUE, PENNSYLVANIA, ASSIGNOR TO OIL WELL SUPPLY COMPANY, OF PITTSBURGH, PENNSYLVANIA, A CORPORATION OF PENNSYLVANIA.

HOSE-COUPLING NOZZLE AND CLAMP.

1,300,956.        Specification of Letters Patent.     Patented Apr. 15, 1919.

Application filed April 30, 1918. Serial No. 231,630.

*To all whom it may concern:*

Be it known that I, EDGAR E. GREVE, a citizen of the United States, residing at Bellevue, in the county of Allegheny and State of Pennsylvania, have invented certain new and useful Improvements in Hose-Coupling Nozzles and Clamps, of which the following is a specification.

The prime object of my invention is to provide a new and improved hose coupling nozzle and clamp of a character particularly designed for use in connection with a hose adapted to carry a considerable fluid pressure, such for example, as a hose employed in connection with a rotary drilling apparatus employed for drilling wells.

In the accompanying drawings, which illustrate applications of my invention,

Figure 1 is a part side elevational and a part vertical sectional view of a hose nozzle and clamp embodying my invention;

Fig. 2 is a horizontal sectional view, the section being taken on line 2—2 of Fig. 1;

Fig. 3, a part sectional view and a part elevational view, the section being on a line at a right angle to the view of Fig. 1; and Fig. 4, a part vertical sectional and a part elevational view of a modified form embodying my invention.

Referring to the drawings, 1 designates a portion of the hose to which the nozzle and clamp are applied. The nozzle of the form of Fig. 1 includes a portion 2, adapted to be entered in the hose. This portion 2, at one end, is formed with an annular flange or enlargement 3, and at its opposite end with a coupling member 4. Between member 4 and enlargement 3, the nozzle is formed with a smooth hose contacting surface designed to make contact with that portion of the hose against which clamping pressure is exerted by the clamp. As illustrated, member or portion 4 is formed with an annular flange 5, an annular recess 6, and an annular flange 7.

Disposed within the divided clamp 8, I provide tapered hose gripping slips or slightly movable wedge members 9 adapted to move with the hose should any slipping of the hose on the nozzle occur; two of these members 9 are shown, and each is provided with a serrated or corrugated hose gripping face 10, and with interlocking or dove-tailed vertically extending meeting edges 11. These interlocking edges of the hose gripping members prevent crimping the hose, as would be the case were the edges straight, when the members are forced tightly into position by the action of the clamp 8.

The clamp 8, as illustrated and as preferred, includes two similar partially encircling members $a$ and $b$, each member having its interior face $c$ tapered in an opposite direction from the taper of the slips 9. Each of the members is further formed with apertured enlargements 12, through which bolts 13 are passed, and with one or more lugs 14 adapted to be entered in recess 6 of the coupling portion or end of the nozzle member.

It will be evident that when the nuts 15 on the bolts 13 are tightened, the clamp will cause the members 9 to tightly grip the hose section and firmly hold it in the desired position between the outer face of the nozzle and the serrated faces of the tapered slips, and, further, that the engaging lugs 14 will be maintained in the recess 6.

In the modified form shown by Fig. 4, the construction, with the exception of the coupling portion 4, is the same as the form of Fig. 1. In this latter construction, portion 4' is provided with a threaded end 5$^a$ adapted to be entered in and secured to a pipe structure.

It will be understood that in the construction shown and described there will be, at times, a slight movement of the end of the hose and the movable slips within the body of the clamp, and that by making that portion of the nozzle designed to be disposed within the clamp, with a smooth hose contacting surface, there will be nothing to injure the hose when said movement occurs.

What I claim is:—

1. In a hose nozzle and clamp construction, the combination with a nozzle member, of a divided encircling clamp member spaced from the nozzle and formed with interiorly tapered faces, movable tapered slips disposed in the space between the nozzle and clamp, and means for securing the clamping members together, said nozzle having a smooth hose contacting surface entered in the portion of the hose within the clamp whereby a slight movement of the hose and its slips within the clamp is permitted.

2. In a hose nozzle and clamp construction, the combination with a nozzle member, of a divided encircling clamp member spaced from the nozzle, movable slips disposed in the space between the nozzle and clamp, said slips having interlocking edges, and means for securing the clamp members together, said nozzle having a smooth hose contacting surface entered in the portion of the hose within the clamp whereby a slight movement of the hose and its slips within the clamp is permitted.

3. In a hose nozzle and clamp construction, the combination with a nozzle member, of a divided encircling member spaced from the nozzle and formed with interiorly tapered faces, movable tapered slips having interlocking edges disposed in the space between the nozzle and clamp, and means for securing the clamp members together.

4. In a hose nozzle and clamp construction, the combination with a nozzle member, of a divided encircling clamp member spaced from the nozzle, said nozzle having a smooth hose contacting surface within the clamp, movable slips having interiorly serrated faces disposed between the nozzle and clamp, and means for securing the clamping members together.

5. In a hose nozzle and clamp construction, the combination with a nozzle member, of a divided encircling clamp member spaced from the nozzle and formed with interiorly tapered faces, movable tapered slips having interlocking edges and interiorly serrated faces disposed in the space between the nozzle and clamp, and means for securing the clamping members together.

6. In a hose nozzle and clamp construction, the combination with a nozzle member, of a divided encircling clamp member spaced from the nozzle and formed with interiorly tapered faces, movable tapered slips having interlocking edges and interiorly serrated faces disposed in the space between the nozzle and clamp, means for securing the clamp members together, and coacting engaging means on the nozzle and clamp members, including a recess on one member and a lug on the other member.

In testimony whereof I affix my signature in presence of two witnesses.

EDGAR E. GREVE.

Witnesses:
J. M. GEOGHEGAN,
LOIS WINEMAN.